United States Patent [19]

Heckman

[11] 4,244,781
[45] Jan. 13, 1981

[54] NON-ASBESTOS MILLBOARD COMPOSITION

[75] Inventor: Peter F. Heckman, North Hills, Pa.

[73] Assignee: Nicolet, Inc., Ambler, Pa.

[21] Appl. No.: 47,119

[22] Filed: Jun. 11, 1979

[51] Int. Cl.³ .............. C03B 13/16; C04B 43/02; D21F 11/00; D21H 5/18
[52] U.S. Cl. .............. 162/145; 29/132; 65/245; 65/253; 65/288; 65/348; 65/374 RM; 162/159; 162/168 NA; 162/181 C; 162/181 D; 252/62
[58] Field of Search .............. 65/245, 253, 288, 348, 65/374 RM; 162/145, 159, 168 NA, 181 C, 181 D; 252/62; 29/132

[56] References Cited

U.S. PATENT DOCUMENTS

| 2,705,198 | 3/1955  | Seybold          | 162/181 D |
| 3,042,578 | 7/1962  | Denning          | 162/181 C |
| 3,317,303 | 5/1967  | Shorr            | 65/253    |
| 3,549,485 | 12/1970 | Eckert           | 162/181 C |
| 3,658,564 | 4/1972  | Gerow et al.     | 252/62    |
| 3,692,509 | 9/1972  | Breiner          | 162/181 C |
| 3,807,013 | 4/1974  | Sukenik          | 65/253    |
| 3,954,556 | 5/1974  | Jackson et al.   | 162/145   |
| 4,072,558 | 2/1978  | Akerson          | 162/181 C |
| 4,153,503 | 5/1979  | Booth et al.     | 162/181 C |
| 4,159,224 | 6/1979  | Cederquist et al.| 162/145   |

Primary Examiner—James C. Cannon
Attorney, Agent, or Firm—Cooper, Dunham, Clark, Griffin & Moran

[57] ABSTRACT

A non-asbestos millboard refractory composition useful for the manufacture of lehr and glass tempering rolls and useful at temperatures above about 650° C. comprises on a dry weight basis 10–30 percent ceramic fiber, 0–10 percent organic fiber, 35–60 percent pyrophyllite and 20–35 percent inorganic binder. This composition is particularly useful in the manufacture of a non-asbestos millboard sheet which is formed by preparing an aqueous slurry of the components of this composition, adding flocculant and developing the flocculated composition into sheet form by placing the slurry on a rotating screened cylinder to effect formation and dewatering, transfering the dewatered and formed slurry to a synthetic felt and then to an accumulator roll, where layers of the slurry are accumulated upon one another to a desired thickness. The accumulated layers are then slit, removed and formed into flat sheets of desired dimensions for subsequent use.

18 Claims, No Drawings

NON-ASBESTOS MILLBOARD COMPOSITION

BACKGROUND OF THE INVENTION

This invention relates to a ceramic-pyrophyllite-clay-silicate composition useful in the production of millboard and particularly useful in the manufacture of the carrying and/or lehr rolls utilized in high temperature glass manufacturing.

In glass making processes there typically occur continuous ribbon and/or discrete plates of glass, where annealing and hardening respectively occur, and along which it is necessary to continuously convey hot sheets or ribbons of glass. It is the function of the carrying or lehr rolls to accomplish this transfer of the hot sheets or ribbons of glass. Such rolls are typically fabricated by cutting discs from millboard and assembling and compressing the discs on a steel mandrel. Rolls which are so prepared are useful for supporting and moving glass from the molten state through an annealing oven or lehr to the finished hot glass plate.

Rolls fabricated in this manner are useful in transporting plate glass through tempering and/or hardening processes involving temperatures up to about 820° C.

In the manufacture of conveying and/or lehr rolls employing ceramic-pyrophyllite-clay composition millboard, it is important that the millboard making up the lehr roll be capable of withstanding temperatures in excess of about 650° C. for substantial periods of time. The conveying and/or lehr rolls must provide a heat resistant surface capable of conveying hot glass without damage to the glass surface. Furthermore, the conveying or lehr rolls must be capable of withstanding high temperatures and physical wear over extended periods of time.

Heretofore, the principal fiber used in lehr and conveying roll millboard compositions has been asbestos fiber. However, in response to adverse publicity about asbestos and the recent increase in the number of government regulations concerning asbestos, a large glass manufacturer decided to discontinue the use of asbestos-containing rolls. This decision and the expressed inclination of other glass manufacturers to discontinue the use of asbestos-containing rolls have underscored the need for a non-asbestos millboard composition.

Various insulating and/or refractory compositions including non-asbestos containing compositions have been previously disclosed. Thus, for example, U.S. Pat. No. 3,042,578 discloses an insulating product consisting of 60–70 percent perlite, 15–30 glass fiber, particularly asbestos and/or kraft fiber, and 10–25 percent sodium silicate. U.S. Pat. No. 3,658,564 discloses insulating structures comprising perlite, sodium silicate and inert fillers including clay, cellulosic materials and alumino-silicate fibers. U.S. Pat. No. 3,933,514 discloses an insulating composition which includes sodium silicate, perlite and fibrous materials such as ceramic fiber, cellulosic fiber and clay fiber. Finally, U.S. Pat. No. 4,090,881 discloses a high temperature refractory adhesive comprising mullite, ceramic fiber, colloidal silica, alumina and bentonite clay.

SUMMARY OF THE INVENTION

In accordance with the present invention a non-asbestos millboard refractory composition is provided comprising on a dry weight basis, 10–30 percent ceramic fiber, 0–10 percent organic fiber, 35–60 percent pyrophyllite and 20–35 percent inorganc binder. An aqueous slurry of this composition which optionally includes 0.1 to 1.0 percent flocculant can then be used in the preparation of a non-asbestos millboard sheet which in turn may be utilized in the manufacture of conveying and/or lehr rolls.

A non-asbestos millboard sheet of this invention is produced by admixing 0–10 percent organic fiber and 10–30 percent ceramic fiber, then adding 35–60 percent pyrophyllite and 20–35 percent inorganic binder in the form of an aqueous solution so as to form an aqueous slurry. 0.1 to 1.0 percent flocculant is then added to the aqueous slurry so as to effect coagulation thereof. The non-asbestos millboard sheet may then be produced using conventional papermaking-type asbestos millboard equipment.

It is therefore one object of the present invention to provide a refractory composition useful in the manufacture of a non-asbestos millboard sheet.

It is a related object to provide non-asbestos millboard sheets useful in the manufacture of carrying and/or lehr rolls of the type utilized in high temperature glass manufacturing.

It is another object to provide a method of preparing the aforementioned millboard sheets.

How these and other objects of the present invention are accomplished will be more fully understood upon reading the accompanying disclosure and the claims which follow thereafter.

DETAILED DESCRIPTION OF THE INVENTION

In accordance with the present invention an improved millboard composition is provided which is completely devoid of asbestos and comprises on a dry weight basis 10–30 percent ceramic fiber, 0–10 percent organic fiber, 35–60 percent pyrophyllite and 20–35 percent inorganic binder.

Useful ceramic fibers include naturally occuring materials and particularly man-made ceramic fibers produced from kaolinite or alumina and silica. Useful ceramic fibers include fibers of various fiber grades, such grades being determined by production methods, shot content, lubrication and the like. Ceramic fibers useful in the practices of this invention may have fiber lengths as great as about 10 inches, although typically the fiber will have lengths averaging about 4 inches. Useful fibers have diameters up to about 12 microns, the average diameter of useful fibers typically averaging 2–3 microns. Useful fiber materials should not melt except at temperatures above about 1760° C. and should retain their physical and chemical integrity when subjected to continuous temperatures up to about 1260° C.

Although other organic fibers may be used in the refractory composition of the present invention including vegetable fiber, e.g. newsprint, the presently preferred organic fiber is kraft fiber which is a soft, wood pulp made chiefly from pine by digestion with a mixture of caustic soda, sodium sulfate, sodium carbonate and sodium sulfide. The wood pulp may be unbleached, semi-bleached or bleached. Since the kraft fiber is present only as an inexpensive and easily distributed component in manufacturing the millboard sheets from the non-asbestos refractory composition, it may be eliminated without harm to the quality and/or integrity of the sheets at high service temperatures where the kraft fiber would char.

Prophyllite is a crystalline hydrous aluminum silicate with an approximate formula of $Al_4[Si_8O_{20}](OH)_4$. Pyrophyllite is similar to talc except that it is slightly harder and does not flux when fired so that it is more useful for refractory purposes. The pyrophyllite employed in the practices of this invention is a finely divided white powder which passes through a 325 mesh sieve (97%). Constitutional water loss occurs above about 760° C., with a corresponding loss in weight of 2.8–3.5%. The chemical analysis expressed as oxides is as follows:

| | |
|---|---|
| $Al_2O_3$ | 15–19% |
| $SiO_2$ | 75–81% |
| $Fe_2O_3$ | 0.2–0.3% |
| $TiO_2$ | 0.0.15% |
| CaO | 0–0.10% |
| MgO | 0–0.04% |
| $Na_2O$ | 0.1–0.4% |
| $K_2O$ | 0.3–2.50% |

The inorganic binder component may be one or more inorganic compounds including, for example, clays, gypsum, fly ash and alkaline ionic silicates such as silicates of sodium or potassium. The presently preferred inorganic binder component of the non-asbestos millboard composition of the present invention comprises by weight 15–30 percent bentonite clay and 3–10 percent silicate based upon the total dry weight of the millboard composition.

Bentonite clay, a montmorillonite mineral with an approximate chemical formula: (Al $Fe_{0.6}FMg0.33$) $Si_4O_{10}$ $(OH)_2$ Na, Ca 0.33 is presently preferred as an inorganic binder. The bentonite clay which is presently most preferred is a high swelling, natural bentonite clay having a particle size in the range 20 to 200 mesh. A preference for certain size particles within this range may exist depending upon the ease of processing the entire composition and depending upon the type of dispersing equipment available. A typical chemical analysis of bentonite clay is as follows:

| | |
|---|---|
| $Al_2O_3$ | 21.08% |
| $SiO_2$ | 63.07% |
| $Fe_2O_3$ | 3.25% |
| FeO | .35% |
| $TiO_2$ | 0.14% |
| CaO | 0.65% |
| MgO | 2.67% |
| $K_2O$ | 0.37% |
| Other | .58% |
| Chemically held $H_2O$ | 5.64% |

The presently preferred silicate for use as an inorganic binder is sodium silicate. The sodium silicate may be any of the large class of compounds manufactured by combining alkali $Na_2O$ and silica $SiO_2$ at high temperatures to form a glass which may then be dissolved to form various silicate solutions. The chemical composition of such silicates may vary from a silicate to alkali ratio of 3.75:1 to 1:2 by weight. Presently preferred in the practices of this invention is a solution with a silicate to alkali ratio of approximately 3.3:1 by weight and 41.5° Be.

In a presently preferred embodiment the non-asbestos millboard refractory composition of the present invention comprises on a dry weight basis 10–20 percent ceramic fiber, 2–5 percent organic fiber, 40–60 percent pyrophyllite, 15–30 percent bentonite and 3–10 percent silicate, and is mainly composed of particulate matter. In this particulate form the composition is not itself adaptable to form millboard sheets on conventional paper-making type asbestos millboard equipment. Therefore, it is essential to chemically charge the composition, mainly composed of particulate matter, to a slurry form similar to the asbestos fiber-like slurry form of asbestos-containing refractory compositions. The chemically charged slurry composed of ceramic fiber, organic fiber, pyrophyllite, and inorganic binder or binders in amounts in the ranges 10–30%, 0–10%, 35–60% and 20–35% by weight, respectively, may be physically transformed into a fibrous flocc similar to an asbestos fiber slurry. This chemically charged slurry can then be used on conventional paper-making type asbestos millboard equipment, whereupon a non-asbestos millboard sheet may be produced which is substantially chemically equivalent to the composition set forth hereinabove.

In order to charge and flocculate the composition, a flocculant, in an amount from about 0.1 to 1.0 percent by weight, is added to an aqueous slurry formed by admixing organic fiber, ceramic fiber, pyrophyllite and inorganic binder or biners. Flocculants useful in the practices of this invention include polyelectrolytes, particularly polyacrylamides. Numerous such flocculants are commercially available including both cationic and anionic polymers of varying charge density and molecular weight. Alternatively, the composition may be charged and flocculated by adjusting the alkalinity of the slurry to pH 10–13, preferably pH 11–12, by addition of a strong base such as alkali metal hydroxide.

After and during forming, the millboard sheet is compressed to give it uniform thickness and to consolidate it. The residual moisture (remaining after application of suction and pressing) may preferably be driven out by heat to accelerate drying.

The followng examples are set forth to more clearly illustrate the present invention but are not intended to limit in any way the scope thereof.

EXAMPLE 1

Kraft fiber is opened and refined to 300 Canadian Standard Freeness (CSF) in a Valley beater. Ceramic fiber is dispersed and mixed with organic fiber slurry. Pyrophyllite, pre-swelled bentonite clay (in water) and sodium silicate are then added to the fiber slurry and thoroughly mixed to form an aqueous slurry of the composition. A portion of the slurry is removed and placed in a beaker fitted with a stirrer. The slurry consistency is adjusted to about 1 to 5%, preferably about 2.5%, and the temperature adjusted to about 20°–30° C., preferably 24° C. With gentle stirring of the slurry, a high charge density, low molecular weight, cationic polymer is added at a concentration of about 0.06 grams per gram of dry solids. Next, in order to flocculate the slurry and thereby make it suitable for drainage through a screen and formation of a sheet thereon, a high molecular weight, low charge density cationic polymer is added at a concentration of about 0.0006 grams per gram of solids. Millboard sheets are then prepared using standard papermaking techniques. Typical data is set forth in Table I.

TABLE I

| FORMULATION, WT. % | |
|---|---|
| Ceramic fiber | 20% |

TABLE I-continued

| | |
|---|---|
| Kraft fiber | 5% |
| Pyrophyllite | 45% |
| Bentonite clay | 25% |
| sodium silicate | 5% |
| PROPERTIES[a] | |
| Density | 51.9 lbs/ft.³ |
| Ignition loss[b] | 9.1% |
| Moisture, % | 1.27% |
| Tensile | 353 psi |
| Tensile[b] | 265 psi |
| Thickness change[b] | 0.74% |

[a]Average of 8 samples.
[b]Samples conditioned for 24 hrs. at 816° C.

EXAMPLE 2

Kraft fiber is refined in a standard disc refiner to 200–400 CSF. Kraft fiber and ceramic fiber are thoroughly mixed in a papermaking beater. Next the bentonite clay, pyrophyllite and sodium silicate are added to the fiber to form an aqueous slurry of the composition.

To the slurry is added a cationic polymer (20 lbs/ton) to coagulate the clay fines and charge the slurry. The slurry is then conveyed from the mixing equipment to a machine chest where it is gently aggitated.

From the machine chest the charged slurry is pumped to a standard papermaking type asbestos millboard machine. Another polymer flocculant is then added to the slurry between the pump and the headbox of the millboard machine. Here the slurry, composed mainly of particulate matter, is flocced and made suitable to produce millboard sheets, as described above. Typical data are set forth in Table II.

TABLE II

| | A | B |
|---|---|---|
| FORMULATION, WT. % | | |
| Ceramic fiber | 19.90% | 20% |
| Kraft fiber | 2.43% | 0% |
| Pyrophyllite | 48.54% | 50% |
| Bentonite clay | 24.27% | 25% |
| Sodium silicate | 4.85% | 5% |
| PROPERTIES[a] | | |
| Density | 51.5 lbs/ft.³ | 47.7 lbs/ft.³ |
| Tensile strength | 241 psi | 198.7 psi |
| Moisture, % | 1.3% | 1.1% |
| % Compression | 38.3% | 43.2% |
| % Recovery | 12.4% | 17.2% |
| % Ignition Loss[b] | 7.17% | 3.32% |
| % Caliper change[b] | 0.28% | — |
| Tensile strength[b] | 127 psi | 139.7 psi |
| % Compression | 46.4% | 36.4[c] |
| % Recovery | 8.7% | 12.1[c] |

[a]Average of 6 samples
[b]Samples conditioned at 816° C. for 24 hours
[c]Samples conditioned at 649° C. for 24 hours

EXAMPLE 3

In order to compare the effect of varying the amount of various components of the composition upon the properties of the millboard sheet, two formulations were prepared involving varying amounts of ceramic fiber and bentonite clay. Millboard sheets prepared therefrom were then tested to determine properties, particularly density and tensile strength. The results of this comparison are set forth in Table III.

TABLE III

| | A | B |
|---|---|---|
| FORMULATIONS, WT. % | | |
| Ceramic fiber | 20% | 30% |
| Pyrophyllite | 50% | 50% |
| Bentonite clay | 25% | 15% |
| Sodium silicate | 5% | 5% |
| PROPERTIES[a] | | |
| Density | 68.8 lbs/ft.³ | 39.2 lbs/ft.³ |
| Tensile strength | 240.9 psi | 42.3 psi |
| % Ignition Loss[b] | 3.9% | — |
| Tensile strength | 423.2 psi | — |

[a]Average of 4 samples.
[b]Samples conditioned at 816° C. for 24 hours.

EXAMPLE 4

In order to determine compression and recovery of millboard sheets in accordance with the present invention, samples were prepared by forming 6" diameter discs in a Buchner funnel and subsequently compressing the composition in a steel mold. Results of this examination are set forth in Table IV.

TABLE IV

| | |
|---|---|
| FORMULATION, WT. % | |
| Ceramic fiber | 20% |
| Pyrophyllite | 50% |
| Bentonite clay | 25% |
| Sodium silicate | 5% |
| PROPERTIES[a] | |
| Density | 64.2 lbs/ft.³ |
| % Compression | 32.2% |
| % Recovery | 12.2% |
| % Ignition Loss[b] | 3.5% |
| Moisture, % | 1.25% |
| % Compression[b] | 26.15% |
| % Recovery[b] | 10.8% |

[a]Average of 4 samples
[b]Samples conditioned at 816° C. for 24 hours.

As will be obvious to one skilled in the art, many modifications, variations, alterations and the like may be made in the practices of the present invention without departing from the spirit and scope thereof as set forth in the preceding description and in the claims which follow.

What is claimed is:

1. A non-asbestos millboard refractory composition comprising on a dry weight basis 10–30 percent ceramic fiber, 0–10 percent organic fiber, 35–60 percent pyrophyllite and 20–35 percent inorganic binder.

2. A non-asbestos millboard refractory composition in accordance with claim 1 wherein the inorganic binder comprises 15–30 percent bentonite clay and 3–10 percent silicate.

3. A non-asbestos millboard refractory composition in accordance with claim 1 comprising on a dry weight basis 10–20 percent ceramic fiber, 2–5 percent organic fiber, 40–60 percent pyrophyllite, 15–30 percent bentonite clay and 3–10 percent silicate.

4. A non-asbestos millboard refractory composition in accordance with claim 1 wherein said silicate is sodium silicate.

5. A non-asbestos millboard refractory composition in accordance with claim 1 wherein said organic fiber comprises kraft fiber.

6. A non-asbestos and asbestos-free refractory millboard composition consisting essentially on a dry weight basis of 10–30% by weight ceramic fiber, 0–10% by weight Kraft cellulosic fiber, 30–60% by weight pyrophyllite, 10–30% by weight bentonite clay and 5–15% by weight sodium silicate.

7. A lehr roll or glass tempering roll comprising substantially circular discs having the composition in accordance with claim 1 or 6 assembled, fitted and pressed onto a bar to provide a substantially cylindrical lehr roll or glass tempering roll.

8. A non-asbestos millboard sheet comprising on a dry weight basis 10–30 percent ceramic fiber, 0–10 percent organic fiber, 35–60 percent pyrophyllite, 20–35 percent inorganic binder and 0 to 5.0 percent flocculant.

9. A non-asbestos millboard sheet in accordance with claim 8 wherein the inorganic binder comprises 15–30 percent bentonite clay and 3–10 percent silicate.

10. A non-asbestos millboard sheet in accordance with claim 8 comprising on a dry weight basis 10–20 percent ceramic fiber, 2–5 percent organic fiber, 40–60 percent pyrophyllite, 15–30 percent bentonite clay, 3–10 percent silicate and 0.1 to 1.0 percent flocculant.

11. A non-asbestos millboard sheet in accordance with claim 8 wherein said silicate is sodium silicate.

12. A non-asbestos millboard sheet in accordance with claim 8, wherein said organic fiber comprises kraft fiber.

13. A non-asbestos millboard sheet in accordance with claim 8 wherein said flocculant comprises a polyelectrolyte.

14. A non-asbestos millboard sheet in accordance with claim 13 wherein said polyelectrolyte comprises a polyacrylamide.

15. A method of producing a non-asbestos millboard sheet in accordance with claim 8 which comprises admixing said organic fiber and said ceramic fiber, adding said pyrophyllite and said inorganic binder in water to form an aqueous slurry, and flocculating and coagulating said slurry to form said millboard sheet from said flocced and coagulated slurry.

16. A method in accordance with claim 15 wherein said flocculating and coagulating of said slurry to form said millboard sheet comprises adding flocculant to said aqueous slurry.

17. A method of producing a non-asbestos millboard sheet in accordance with claim 16 which comprises admixing said organic fiber and said ceramic fiber, adding said pyrophyllite and said inorganic binder in the form of an aqueous solution in order to form an aqueous slurry, adjusting the water content of said slurry to about 1.0 to 5.0 percent and the temperature to about 20.0° to 30.0° C., adding a low molecular weight cationic polymer in an amount from about 0.05 to 5.0 percent, then adding a high molecular weight cationic polymer in an amount from about 0.05 to 0.5 percent to coagulate said slurry and forming said millboard sheet from said coagulated slurry.

18. A method in accordance with claim 15 wherein said flocculating and coagulating of said slurry to form said millboard sheet comprises adjusting the alkalinity of said slurry to a pH in the range pH 10–13 to coagulate said slurry and forming said millboard sheet from said coagulated slurry.

* * * * *